Figure 1:
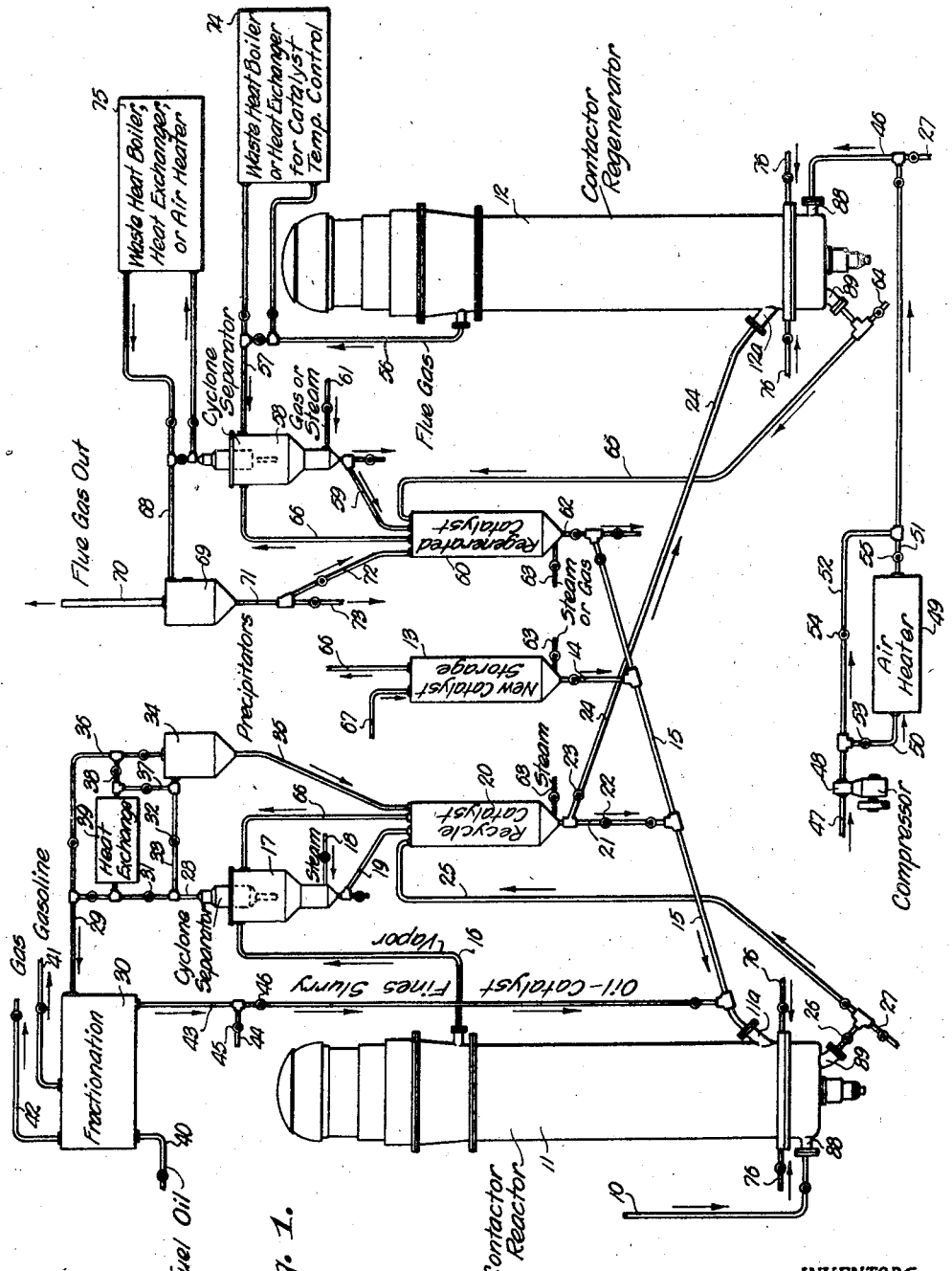

INVENTORS.
Charles W. Stratford
Joe A. Altshuler
David H. Putney
BY
ATTORNEY.

April 15, 1947. C. W. STRATFORD ET AL 2,419,098
CONTACTING GASES AND VAPORS WITH CYCLICALLY MOVING CATALYST
Filed June 21, 1946 2 Sheets-Sheet 2

INVENTORS
Charles W. Stratford
Joe A. Altshuler
David H. Putney
BY Thos. E. Scofield
ATTORNEY.

Patented Apr. 15, 1947

2,419,098

UNITED STATES PATENT OFFICE 2,419,098

CONTACTING GASES AND VAPORS WITH CYCLICALLY MOVING CATALYST

Charles W. Stratford, Joe A. Altshuler, and David H. Putney, Kansas City, Mo., assignors to Stratford Development Corporation, Kansas City, Mo., a corporation of Delaware Application June 21, 1946, Serial No. 678,272

5 Claims. (Cl. 196—52)

Our invention relates to improvements in catalytic, gaseous or vapor phase reactions and refers more particularly to catalytic reactions performed in cyclic steps of a process including reaction and regeneration stages. This application is a continuation-in-part of Serial No. 509,702, filed November 10, 1943.

The process is not limited to the reaction or conversion of any particular materials but is adaptable to any catalytic process wherein the materials undergoing reaction are maintained in the vapor phase and are brought in intimate contact with a solid catalyst. By way of illustration, but not in a limiting sense, examples of such processes are the catalytic conversion or cracking of petroleum hydrocarbons as well as hydrogenation, dehydrogenation, isomerization, polymerization, aromatization and desulfurization of hydrocarbons in which the instant process may be used.

In processes involving catalytic chemical reactions metals or metals in combination with other catalysts may be required while in processes involving the conversion of hydrocarbons, natural or synthetic catalysts may be used. The size of the catalyst will be selected according to the conditions maintained including the velocity of travel of the reactants, porosity of the particles and other factors which will affect contact between the fluids and solids in the mixture.

In brief, the salient features of novelty in the process as applied to catalytic cracking reside primarily in imparting velocity to the mixture of gaseous reactants and catalyst entirely independent of the energy supplied by the feed of said materials to the reaction or regenerating steps. By this independent control over the velocity a more homogeneous and uniform mixture of the particles of catalyst and reactants is obtained than by relying upon energy furnished by pumps or reduction of pressure of the feed.

A further feature of novelty is the control obtained over the ratio of catalyst to reactants by recirculation of unregenerated catalyst within the reaction step.

Additional features reside in the establishment of separate cyclic zones, a reaction zone where a homogeneous mixture of catalyst and fluid reactants is created, a regenerating zone where a stream of contaminated catalyst and combustible or oxidizing gas exists, wherein the maintenance of uniform and homogeneous conditions by means of positive mechanical rotors or impellers serves to distribute the particles of catalyst throughout the gaseous medium and assure better contact therebetween.

It is known that heretofore the importance of intimacy of contact and homogeneity of dispersion has been appreciated, but conditions of mixture have always been dependent upon energy supplied through the feed to the reactor or regenerator to obtain effective contact and dispersion. In contrast thereto there is provided a system and process in which the velocity of the circulating streams governs the completeness of dispersion or extent of contact of the fluid and solid particles and this velocity is entirely independent of the energy supplied through the agency of the feeds to the reactor or regenerator.

Attempts have been made to control the ratio of catalyst to reactants by the feed rate of the components and in some cases a reduction in ratio was obtained by bleeding a portion of the catalyst from the cycle. In so far as is known, however, no provision has ever been made for increasing the ratio of the catalyst and reactants above the ratio established by the feed.

Rapid circulation and intimate contact of the reactants and catalyst and even distribution of the catalyst throughout the stream of reactants or throughout the stream of regenerating gas permits the use of optimum temperatures in the reactor and regenerator. In the conversion of hydrocarbons temperature conditions may be more accurately controlled due to uniformity of distribution of the catalyst and reactants and the resultant product more definitely predicated. Intimate contact and uniform dispersion obtained by energizing the streams of suspended catalyst independently of the feed in the reactor and regenerator exposes considerably more catalytic surface to the reactants and combustion gases and eliminates dead spots in both stages.

The process affords catalyst within the reactor in a more uniform and constant state of activity than in catalytic methods where a static bed or a slowly moving bed are used.

As fouling of the catalyst is greatly reduced by limiting its residence time in the reactor, removal of this contamination by oxidation in the regenerator is more easily effected and at considerably lower temperatures, eliminating to a great extent the possibility of damage to the catalyst by excessive temperatures normally existing during regeneration or caused by localized overheating.

Further objects and advantages of the invention will be apparent during the course of the following description in which the process has been applied to the cracking of hydrocarbon oils in the presence of a finely divided solid catalytic material.

Figure 2:
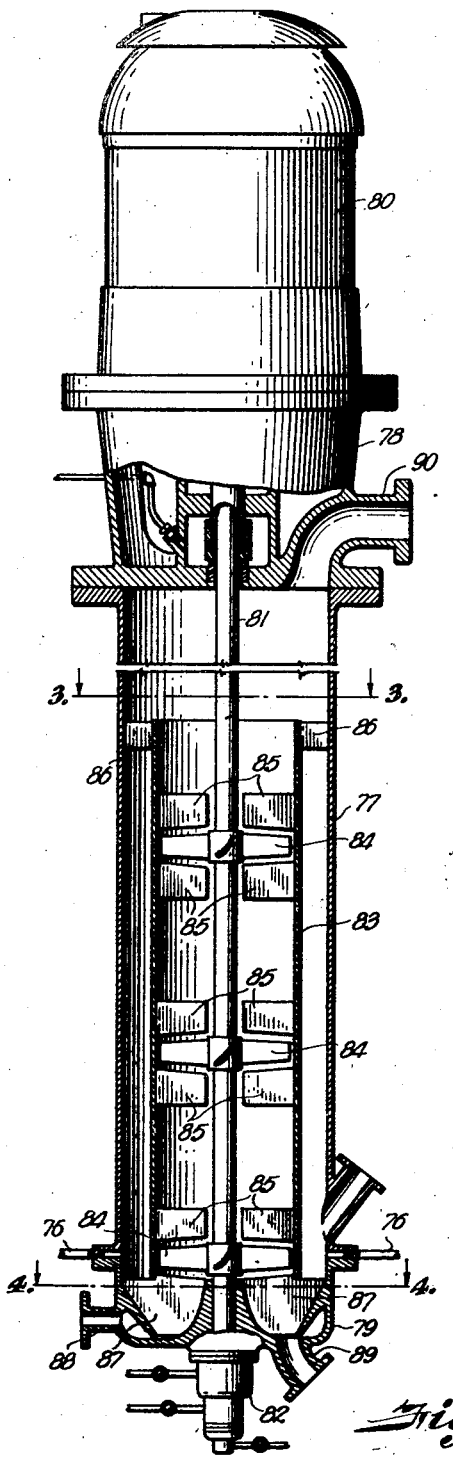
Figure 3:
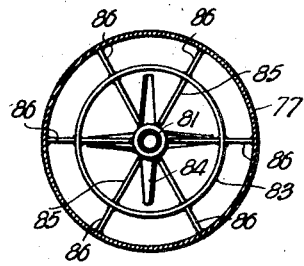
Figure 4:
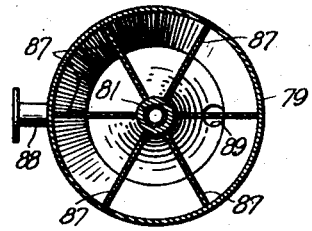

In the accompanying drawings which form a part of the instant specification and are to be read in conjunction therewith, Fig. 1 is a flow diagram of the process as applied to the cracking of hydrocarbon oils, Fig. 2 is a sectional view of the vapor contactor and regenerator, Fig. 3 is a view taken along the line 3—3 in Fig. 2 in the direction of the arrows, and Fig. 4 is a view taken along the line 4—4 in Fig. 2 in the direction of the arrows.

Referring to Fig. 1, which is a flow diagram of a catalytic cracking system, the feed stock is brought to a desired predetermined temperature in a suitable heater, not shown, from which it is discharged through line 10 to the bottom of the contactor-reactor 11. The extent to which the charge is preheated is conventional in this type of operation. This reactor is similar in construction to the contactor-regenerator shown at 12 and detailed in Figs. 2, 3 and 4 of the drawings. Solid catalyst is supplied from a tank or bin 13 designated as new catalyst storage. The catalyst is withdrawn from the storage bin 13 through pipe 14 and is directed along diagonal pipe 15 which connects to a nozzle 11a near the bottom of reactor 11. In the reactor hydrocarbon supplied through pipe 10 and catalyst through pipe 15 are intimately intermixed and the vapors reacted as hereinafter described in connection with the explanation of the contactor.

The reacted vapor with whatever catalyst entrained therewith is discharged from contactor 11 through pipe 16 and is passed to a cyclone type separator 17 where the greater part of the solid material is separated. An open steam connection 18 controlled by suitable valves supplies steam to the separator for removing volatile hydrocarbons and purging the entrained catalyst of hydrocarbon vapors. Catalyst separated in 17 passes from the bottom of the cyclone separator through pipe 19 to recycle catalyst storage 20. This storage tank has a return connection 21. Used catalyst may be recycled through pipe 15 to the reactor, or by closing valve 22 and opening valve 23 in pipe 24 the used catalyst may be diverted to regenerator 12. Pipe 24 is connected to the regenerator at nozzle 12a. A connection 25 between the top of the recycle catalyst storage and the bottom of reactor 11 may be used to exhaust catalyst from the reactor when the plant is shut down by introduction of gas or steam by opening valve 26 and supplying gas or steam through pipe 27.

Following the vapor travel from the top of separator 17 the vapors pass through pipes 28 and 29 directly to fractionation diagrammatically shown at 30, or by closing valve 31 in pipe 28 and opening valve 32 in pipe 33 the vapors may be directed through precipitator 34 where additional catalyst fines are extracted. Additional catalyst separated in the precipitator is returned from the bottom of the precipitator through pipe 35 to the top of recycle catalyst storage tank 20. Vapors discharged from the top of the precipitator pass through pipes 36 and 29 to fractionation 30. Lines 37 and 38 controlled by suitable valves offer opportunity for by-passing the precipitator 34. By manipulation of valves in lines 28, 33, 37 and 38 the vapors may be diverted through heat exchange 39, or the precipitator, or either or both of these stages may be eliminated prior to directing them to fractionation. In the fractionating equipment 30 there is separated a fuel oil or recycle stream removed through pipe 40, a gasoline stream diverted through pipe 41 and unliquified gas through pipe 42. A part or all of the liquid bottoms separated during fractionation containing catalyst fines may be recycled through pipe 43 for introduction to the reactor with catalyst supplied through pipe 15. If desired, slurry of catalyst and oil returned through pipe 43 may be drawn off through pipe 44 by manipulation of valves 45 and 46.

Referring now to regeneration of the catalyst, used catalyst from hopper 20 which is at substantially reaction temperature flows through pipe 24 to regenerator 12 by closing valve 22 and opening valve 23. Air to burn off or consume by oxidation the accumulated carbon particles fouling the hot catalyst is introduced with the catalyst to the regenerator through pipe 46. Air supplied to the system for regeneration of the catalyst is introduced through pipe 47 and is charged by compressor 48 to heater 49 through pipe 50. After being heated the air is passed through pipes 51 and 46 to the regenerator. The heater 49 may be by-passed through line 52 by manipulation of valves 53, 54 and 55 during normal operation.

In the regenerator catalyst contamination is removed to the extent desired, while circulating the stream of gas and catalyst through the vessel. Flue gas from regenerator 12 with catalyst which may be entrained therewith passes through pipes 56 and 57 to separator 58 where a greater part of the catalyst is removed from the gas and is discharged from the bottom of the separator to pipe 59 to the regenerated catalyst storage tank 60. Steam or other inert gas may be introduced into the bottom of separator 58 through pipe 61 to assist in the catalyst separation and to purge the catalyst voids of other undesirable gaseous material. Regenerated catalyst accumulated in storage 60 may be drawn off through pipe 62 and combined with fresh catalyst or used catalyst which is being charged to the reactor through pipe 15. Catalyst storage tanks 13, 20 and 60 are equipped with steam or gas pipes 63 to permit stripping or purging of the catalyst collected therein and to facilitate movement of the catalyst when it is to be discharged from these vessels. Valves in the draw-off lines from the separate catalyst storage tanks are used to control the amount of the different types of catalyst which is recycled. To exhaust catalyst from the regenerator 12 when the system is not in operation, air under pressure is supplied through pipe 64 and the catalyst conducted as a suspensoid in the air media through pipe 65 into the top of storage tank 60. Each of the catalyst storage vessels 13, 20 and 60 has a vent line 66, two of which are connected into the cyclone separators 17 and 58, respectively. The new catalyst storage vessel 13 has a supply pipe 67 through which fresh catalyst is added. The flue gas relieved of the greater part of the entrained catalyst passes from separator 58 through pipe 68 to a precipitator 69 in which additional fines are removed. From the top of the precipitator the flue gas passes out through pipe 70 while the fines separated in the precipitator are drawn off through pipe 71 to be returned through line 72 to storage 60 or diverted from the system through pipe 73.

Before subjecting the catalyst laden flue gas to separation in cyclone 58 and precipitator 69, the flue gas-catalyst mixture may be diverted through waste heat equipment designated diagrammatically at 74 and 75.

To clean the equipment either before or after operation, steam may be introduced through pipes 27. Also, recycled gas may be introduced into the reactor and fuel gas to the regenerator through the same line. In order to remove accumulated material in the annular passageways of the reactor and regenerator, air blasts may be injected through pipes 76. Steam may also be supplied through these pipes for stripping the catalyst in the annular passageways.

The reactor 11 and regenerator 12 are similar in design and the details of construction are shown in Figs. 2 and 4 of the drawing. To simplify the description the device will be called a contactor. Its function in the system both as a contactor and regenerator is to thoroughly, intimately and uniformly mix the solid catalyst particles throughout the gaseous medium in which they are suspended. It consists of a shell and a circulation tube in which are positioned one or more impellers driven by a variable speed motor or other type of prime mover located at the top. The impellers circulate the gas-catalyst mixture through and around the open ended tube at a relatively high rate of speed. The passageways formed by the circulation tube in the shell of the contactor, as well as the impeller and all related parts which in any way are associated with the fluid flow are highly streamlined and designed to reduce, in so far as possible, friction and concentration of the heavier solid particles. At the upper end of shell 77 is mounted at a flanged connection a head 78. At the bottom of the shell is a base 79. Mounted above the head 78 is a motor 80. The shaft of the motor is integrally coupled with impeller shaft 81 which extends longitudinally of the contactor casing and is guided at its lower extremities in a fluid cooled bearing 82. Both the upper and lower bearings of the impeller shaft are lubricated and cooled.

Within the shell 77 of the contactor is the open ended circulation tube 83. Within the circulation tube and mounted on impeller shaft 81 are impellers 84. Three impellers have been shown in Fig. 2, one at the top, a second in an intermediate position, and a third at the bottom. Additional rotors or impellers may be used according to the type of catalyst being employed, the reactants undergoing treatment, and the conditions and circumstances of operation. The blades of the impellers are shaped to obtain maximum efficiency in moving the gas-catalyst mixture. Within the circulating tube above and below the impellers are straightening vanes 85. In the annular space between the circulating tube and the outer shell near the top of the tube are radial vanes 86. Similar radial vanes 87 are located in the base 79 below the circulating tube and lower impeller and perform the function of straightening vanes 85 to prevent vortexing at the bottom impeller inlet.

The materials to be mixed, which in the reactor include catalyst and reactant gases, and in the regenerator catalyst and oxidizing gases, are introduced near the bottom of the respective vessels. In the case of the reactor, hydrocarbons are charged through pipe 10 and nozzle 88, while in the case of the regenerator, air is supplied through pipe 46 to a nozzle at the same location on the opposite side of the vessel. Catalyst is removed from both the reactor and regenertor through nozzles 89 as described in the explanation of the operation of the respective contactors. The vapor or gas with entrained catalyst is discharged from the respective vessels through nozzle 90 in head 78.

In operation the mixture of catalyst and gas introduced at the bottom of the shell is drawn by the impellers up through the circulation tube 83 in a lineal flow and discharged from the top of the tube where the direction of flow is reversed and a portion of the mixture directed downwardly through the annular space between the circulation tube and the shell. As indicated within the circulation tube and at the top and bottom of the tube in the annular space are a plurality of straightening vanes which prevent spiraling or rotative turbulence in the flowing stream.

By means of this device a thorough, complete and uniform dispersion of the catalyst through the gaseous medium with which it is circulated is obtained. Considerably more catalyst can be circulated with a gaseous medium by positive independently driven impellers than where energy to produce the mixture is furnished through the agency of the feed itself. Thus there is offered considerably more surface to the reactants or combustible gas than is possible with the conventional fixed bed or moving bed operation.

Particle size of the catalyst used may vary and the velocity of circulation will, of course, depend upon a number of factors, including the catalyst size, weight and the velocity at which the impellers are rotated. It is essential that conditions prevail in both the reacting and regenerating steps to assure complete mixing and uniform dispersion in order that a maximum surface of the catalyst be exposed to the reactants in the case of the reactor and the greatest possible opportunity be afforded for elimination of contaminants from the catalyst surface in the case of the regenerator.

Heretofore mixing of catalyst with the reactants or regenerating gas was accomplished by passing the fluids through a static bed, flowing them through a moving bed, or by contact with what is termed as a fluid mass of catalyst. This latter contact method employed or made application of the gas lift principle in which a downflowing stream of high solids concentration is balanced with an upflowing stream of gas of low solids concentration. This method commonly known as the "fluid catalyst" system of contact is subject to the disadvantages and shortcomings of the static and moving bed method to perhaps a lesser degree, in so far as availability of catalyst surface is concerned. Channeling, accessibility and availability of catalyst surface in the reactor and regenerator are in all methods dependent upon and are functions of the solids feed rate, composition, particle size and vapor or gas velocity produced by the feed.

Purposely no mention has been made of the operating conditions of the catalytic cracking system described including character of the charging stock, temperature and pressure existing in the reactor, regenerator and separating stages, type of catalyst used or particle size of catalyst employed. Likewise, little or no importance has been given to the variety of different types of commercial processes to which the invention is adapted.

Conditions prevailing in each case will depend upon the particular method involved, the stocks treated and the results desired. Our invention pertains primarily to the effectiveness of mixing in stages of the process where thoroughness of mixing has a profound and critical influence upon the overall results obtained. It is designed to aid, improve and augment throughput, yield and quality of product while being an important factor in reducing capital cost of equipment and operating expenses.

It is contemplated that multiple reactors may be used with a single regenerator or multiple regenerators with multiple reactors while maintaining independent control in each reactor of the catalyst reactant ratios and the catalyst conditions.

As many possible embodiments may be made of the invention without departing from the scope thereof, it is to be understood that all matter herein set forth or shown in the accompanying drawings is to be interpreted as illustrative and not in a limiting sense.

From the foregoing it will be seen that our invention is one well adapted to attain all of the ends and objects set forth, together with other advantages which are obvious and which are inherent to the process and apparatus described.

Having thus described our invention, we claim:

1. A process of catalytically reacting gaseous materials and regenerating the catalyst wherein the reaction and regeneration are performed in separate steps each having a cyclic flow of materials therein including upflowing and downflowing columns which have a common axis, the improvement which resides in imparting mechanical rotative energy to the cyclic streams of catalyst and reactant mixtures in the respective steps independent of the energy supplied to the feed of said materials to the respective steps.

2. A process as in claim 1 in which both lineal and rotative velocities are mechanically imparted to the cyclic streams of the reaction and regeneration steps.

3. A process as in claim 1 in which both lineal and rotative velocities are mechanically imparted to the upflowing columns of the cyclic streams in the reaction and regeneration steps.

4. A process as in claim 1 in which a portion of the catalyst is diverted from the reaction step to the regeneration step and a portion of the regenerated catalyst recycled to the reaction step.

5. A process of catalytically reacting gaseous material with a finely divided catalyst accompanied by catalyst regeneration comprising the steps of combining the gaseous reactants and catalyst and establishing a cyclic stream of the mixture in the reaction step, said stream constituting upflowing and downflowing columns having a common axis, mechanically imparting lineal and rotative velocities to the upflowing column of the cyclic stream in the reaction step, diverting a portion of the catalyst from the reaction step to the regeneration step and recycling regenerated catalyst to the reaction step and unregenerated catalyst within the reaction step to control catalyst and hydrocarbon ratio in the reaction step.

CHARLES W. STRATFORD.
JOE A. ALTSHULER.
DAVID H. PUTNEY.